(12) United States Patent
Conner et al.

(10) Patent No.: US 6,868,641 B2
(45) Date of Patent: Mar. 22, 2005

(54) BREAKAWAY POST BASE

(76) Inventors: Michael D. Conner, 1304 Wood St., Big Spring, TX (US) 79720; Stanley E. Partee, Partee Enterprises, P.O. Box 3010, Big Spring, TX (US) 79721-3010

(\*) Notice: Subject to any disclaimer, the term of this patent is extended or adjusted under 35 U.S.C. 154(b) by 0 days.

(21) Appl. No.: 10/135,391

(22) Filed: May 1, 2002

(65) Prior Publication Data

US 2003/0205006 A1 Nov. 6, 2003

(51) Int. Cl.[7] .............................................. E02D 27/42
(52) U.S. Cl. ............................ 52/98; 52/165; 52/169.9; 52/726.1; 52/726.3; 52/726.4
(58) Field of Search ................................. 52/98.95, 165, 52/296, 726.1, 726.3, 726.4, 169.1, 169.9, 155; 403/2; 248/548, 900; 256/13.1

(56) References Cited

U.S. PATENT DOCUMENTS

| | | | |
|---|---|---|---|
| 1,575,040 A | | 3/1926 | Crum |
| 3,451,319 A | | 6/1969 | Gubela |
| 3,521,917 A | | 7/1970 | King |
| 3,563,502 A | * | 2/1971 | Dayson ........................ 52/98 |
| 3,572,223 A | * | 3/1971 | Vierregger ................... 52/296 |
| 3,630,474 A | * | 12/1971 | Minor ........................... 52/98 |
| 3,671,738 A | * | 6/1972 | Beachley ..................... 362/431 |
| 3,713,262 A | * | 1/1973 | Jatcko ............................ 52/98 |
| 3,792,680 A | | 2/1974 | Allen |
| 3,820,906 A | | 6/1974 | Katt |
| 3,837,752 A | * | 9/1974 | Shewchuk ...................... 403/2 |
| 3,951,556 A | * | 4/1976 | Strizki ............................ 403/2 |
| 4,032,248 A | | 6/1977 | Parduhn et al. |
| 4,052,826 A | | 10/1977 | Chisholm |
| 4,926,592 A | | 5/1990 | Nehls |
| 5,596,845 A | * | 1/1997 | Strizki ............................ 52/98 |
| 5,749,189 A | | 5/1998 | Oberg |
| 5,855,443 A | | 1/1999 | Faller et al. |
| 5,878,540 A | * | 3/1999 | Morstein ....................... 52/296 |
| 6,216,414 B1 | * | 4/2001 | Feldberg ..................... 52/736.1 |
| 6,254,063 B1 | | 7/2001 | Rohde et al. |
| 6,264,162 B1 | | 7/2001 | Barnes et al. |
| 6,336,620 B1 | * | 1/2002 | Belli ............................ 248/519 |
| 6,422,783 B1 | * | 7/2002 | Jordan ............................. 404/9 |
| 6,540,196 B1 | * | 4/2003 | Ellsworth .................... 248/548 |

FOREIGN PATENT DOCUMENTS

| | | |
|---|---|---|
| CA | 973677 | 9/1975 |
| DE | 1255128 | 11/1967 |

OTHER PUBLICATIONS

P. & H. Tube Corporation, "POZ–LOC Slip–Base System" Brochure, Drawings Dated Mar. 24, 1998.

\* cited by examiner

Primary Examiner—Jeanette E. Chapman
(74) Attorney, Agent, or Firm—Richard C. Litman (57) ABSTRACT

A breakaway post base includes a pair of adjacent slip plates to allow separation of the upper portion of a traffic sign or the like from its permanently mounted base. The two plates are triangular with notches at their apices, with the plates and related structure secured together by bolts through the apex notches. An impact on the upper post dislodges the bolts, allowing the upper post to move freely and preventing significant damage to the sign structure. At least one of the slip base plates includes a sleeve extending therefrom, into which one end of the post is installed. The post is prevented from rotating relative to the slip base by a series of set screws installed through the slip base sleeve and locking the post immovably therein. Thus, a sign supported by the present assembly cannot rotate relative to the slip base plate.

5 Claims, 4 Drawing Sheets

BREAKAWAY POST BASE

BACKGROUND OF THE INVENTION

1. Field of the Invention

The present invention relates generally to supports for signs and similar structures, and more particularly to improvements in breakaway bases and connections for highway signs and the like. The present sign support utilizes set screws to lock the sign support pipe within the breakaway base or connector component, thereby precluding twisting or turning of the pipe within the base and corresponding misalignment of the sign.

2. Description of the Related Art

It has been recognized for some time that it is not desirable to construct highway sign supports and similar structures, of extremely durable and damage resistant materials. Generally, the impact forces from a motor vehicle hitting such a sign, result in severe damage to the vehicle and possible injury to the occupant(s) as well as destruction of the sign support structure. Moreover, the additional cost of the sign structure for such relatively strong and massive sign supports, results in considerably greater costs in labor and materials to replace such a sign when it is damaged.

As a result, a number of different assemblies have been developed to provide an intentionally weak highway sign structure which will flex, break, and/or disassemble upon impact by a vehicle. It is of course desirable to provide a structure which will disassemble upon impact without damage to components, in order to allow the previously used components to be reassembled without requiring replacement of any significant or costly components (other than perhaps small fasteners, etc.).

One such sign support system which has been developed, is the Texas Universal Triangular Slipbase System (TUTSS). This system utilizes mating triangular plates having notched apices, with bolts installed at each apex to clamp the apices of the plates together. Shear forces caused by an impact, result in the two plates moving apart from one another in shear and dislodging the bolts from their apex notches in the triangular plates. Most, if not all, of the structure is reusable and may be reassembled after an impact, with the impact possibly resulting in the need to replace the readily available and inexpensive post or pipe, bolts, nuts, etc.

The TUTSS assembly utilizes a specially configured slipbase component, having a relatively large diameter relief area formed within the base of the pipe attachment collar at its juncture with the triangular plate. This relief area is provided for clearance for a split ring collar, which is tightened around the base of the pipe after passing the slipbase component over the end of the pipe. The split ring collar is captured by the slipbase component and prevents the pipe from being pulled from the slipbase.

The problem with the split ring collar support pipe retention structure, is that the cylindrical pipe can turn within the collar unless an excessive amount of force is used to tighten the pinch bolt of the collar in place on the pipe. While this may not be so critical for signs utilizing multiple support columns, a sign having a single support pipe or column, may turn or rotate within the slipbase collar. This is particularly a problem in areas of high winds, where aerodynamic forces can cause the relatively large plate area of the sign to flutter or work back and forth in the wind. This produces a torsion on the pipe or post holding the sign, which torsional force is transmitted down the pipe to the slipbase and collar contained therein. The collar may turn on the pipe, and/or the collar may turn relative to the slipbase, unless the various bolts holding the assembly together are extremely tight.

Standards call for the pinch bolt on the collar to be tightened to a torque of sixty foot-pounds, with the three apex bolts securing the slipbase components together being tightened to forty foot-pounds of torque. Even these high torque values still fail to prevent a sign on a single support pipe, from gradually rotating or twisting the pipe relative to the slipbase assembly. It has been found that in areas of high wind, that maintenance crews sometimes have to realign signs using this system, as often as once a week. The costs of this frequent maintenance can result in the cost of the sign being many times the initial purchase and installation cost, over the life of the sign.

It will be appreciated that the realignment of signs using the TUTSS assembly is not a trivial task, as it requires the mechanic to loosen the three apex bolts securing the slip base components together, slide the upper slipbase up the pipe to access the split collar and its pinch bolt, retorque the pinch bolt as required, realign the sign, and tighten the three slipbase apex bolts to the proper torque. This procedure requires at least a few minutes, in addition to the travel time and costs of operating a vehicle to travel to the site where the sign is located.

The present invention responds to this problem by locking the base of the post or pipe into the slipbase by means of a series of set screws, which penetrate the side walls of the slipbase collar and engage the walls of the pipe. The point compression of the setscrews into the side wall of the pipe, prevents rotation of the pipe within the slipbase collar. Thus, once the sign post assembly of the present invention has been assembled, no further periodic maintenance is required in order to maintain the alignment of the sign and post relative to the mounting base. The present system thus provides significant cost savings in terms of maintenance, over the life of the sign.

A discussion of the related art of which the present inventors are aware, and its differences and distinctions from the present invention, is provided below.

U.S. Pat. No. 1,575,040 issued on Mar. 2, 1926 to Rufus M. Crum, titled "Flagpole," describes a hinged pole assembly in which the upper portion of the pole is pivotally secured to the upper end of the stationary lower portion. The bottom end of the pivoting upper portion extends downwardly past the pivot hinge to seat within the stationary lower portion of the pole, where it is pinned in an upright position by a removable bolt. This arrangement allows the upper portion of the pole to be lowered for installation or removal of a flag to or from its upper end. Crum does not provide any form of shear plates which are secured together by bolts to allow the upper and lower portions to separate from one another, as is the case with the present sign support invention.

U.S. Pat. No. 3,451,319 issued on Jun. 24, 1969 to Hans E. Gubela, titled "Road Guidepost," describes a sign post comprising a wood core with a plastic shell or cover. A tapered attachment flange is provided at the top of the base which is installed in the ground, with a tapered shoe being secured to the bottom end of the post and engaging the flange of the base. Impact with the post dislodges the shoe from the flange, allowing the post to be reinstalled to the base. However, the Gubela assembly is unidirectional, due to the taper of the components, and can only be assembled in one orientation. Moreover, the manufacture of the wood core with its plastic cover is relatively labor intensive, thus resulting in considerably higher manufacturing costs than the present sign post formed of a length of stock pipe material.

U.S. Pat. No. 3,521,917 issued on Jul. 28, 1970 to Charles E. King, titled "Positive Action Clamp," describes a sign having a permanently installed base with a breakaway upper column or post. Two opposed cheek plates are attached to the bottom end of the upper portion by spring compression bolts and nuts which pass through the post and cheek plates. Lateral force on the upper portion of the sign causes the cheek plates to spread against the compression of the springs, thereby allowing the upper portion of the sign to break loose from its attachment to the lower portion. Longitudinal force causes the upper portion of the sign to pivot about its lower end which rests upon the fixed bottom column, again allowing the upper portion to break loose from the lower portion. However, the King sign assembly with its opposed cheek plates is only adaptable to square or rectangular section posts, and no mating, horizontally shearing plates are provided by King for connecting cylindrical sign column components.

U.S. Pat. No. 3,792,680 issued on Feb. 19, 1974 to Francis R. Allen, titled "Flag Pole," describes a hinged pole assembly with an upper portion which is hingedly attached to a fixed lower portion. The lower end of the upper portion is counter weighted and nests within the hollow upper portion of the fixed lower end of the assembly when the upper portion of the pole is erected. The upper portion of the Allen pole cannot break away from the lower portion without damage. The Allen assembly thus more closely resembles the flagpole of the '040 U.S. Patent to Crum, discussed further above, than it does the present assembly.

U.S. Pat. No. 3,820,906 issued on Jun. 28, 1974 to Herbert L. Katt, titled "Highway Sign Post," describes a specially configured, frangible assembly for use in assembling lengths of channel end to end in a highway sign post. One component comprises a casting or the like having a generally U-shaped cross section, with a groove formed medially thereabout to provide a line of weakening. A second component bolts to the opposite side of the channel, to sandwich the two ends of the channel therebetween. Impact on the upper channel causes the U-shaped casting to break along its line of weakening and also breaking the second component. The lower bolt holding the assembly to the lower portion of the channel, bends as the upper portion of the sign is pushed over but continues to hold all of the components together. Katt thus teaches away from the present invention, which provides for separation of the sign post components without damage to any significant or costly components thereof.

U.S. Pat. No. 4,032,248 issued on Jun. 28, 1977 to Alfred P. Parduhn et al., titled "Articulated Highway Delineator Post," describes a two piece post formed of channel sections, with a sleeve having one open side connecting the two sections together end to end. When the upper portion of the post is struck, the lower end pivots about its attachment in the sleeve to extend out of the open side of the sleeve. The Parduhn et al. assembly thus remains completely assembled and does not separate, as does the present sign post assembly.

U.S. Pat. No. 4,052,826 issued on Oct. 11, 1977 to Douglas B. Chisholm, titled "Breakaway Coupling Assembly With Fracture-Initiating Washer," describes various embodiments of a cylindrical sleeve having a partially threaded core and a series of weakening grooves in the outer surface thereof. The sleeves are used to support a base plate, with bolts passing through the base plate and engaging the threaded cores of the sleeves. A washer having a toothed surface is installed between each sleeve and the plate. Bending force upon a pole or the like supported by the base plate, results in excessive compressive force being applied to the sleeves to the side away from the compressive force. This drives the toothed washers downwardly against the sleeves, fracturing the sleeves along their weakening lines and allowing the assembly to collapse. The Chisholm sleeves are specialized components which must be replaced after the sign is displaced, whereas all specialized components of the present system are reusable.

U.S. Pat. No. 4,926,592 issued on May 22, 1990 to Charles O. Nehls, titled "Breakaway Sign Post Coupling," describes several different embodiments of an assembly essentially comprising a pair of opposed, triangular plates with notched apices. Bolts are installed in the notches to secure the plates together. Each plate has an additional component extending therefrom, which accepts a post therein. An impact upon the upper post causes the two plates to separate in horizontal shear, with the bolts dislodging from their positions in the notches of the triangular plates. In one embodiment (FIG. 8), a cylindrical pipe is installed in the upper connector component. This assembly is the earliest example of which the present inventors are aware, of pairs of opposed triangular slip bases being used to secure a separable upper post to a fixed lower post. The Nehls assembly is also similar to the structure of the Texas Universal Triangular Slipbase System (TUTSS), noted further above. However, Nehls does not provide a collar integrally formed with the triangular plates, which collar completely surrounds the associated end of the cylindrical pipe component, as provided by the present invention. Moreover, Nehls bolts the ends of the pipes (or other elongate posts) completely through the posts and upright post mounting components extending from the triangular plates. Separation of the posts from their respective fittings, would require removal or destruction of the bolts. In contrast, the set screws of the present arrangement hold the post securely in place, but still allow withdrawal of the post from the corresponding fitting without damage to the fasteners or requiring removal thereof, when excessive force is applied.

U.S. Pat. No. 5,749,189 issued on May 12, 1998 to Dan Oberg, titled "Post Device," describes a socket for installing a pipe or the like therein. The socket includes a series of radially disposed lugs, through which corresponding bolts or studs are installed to secure the socket to an underlying concrete pad or the like. The lugs have open sides, which allow the bolts to pull free in the event the socket is dislodged from its base due to impact with the pole extending therefrom. Oberg does not disclose any means for securing the pole within the socket, however.

U.S. Pat. No. 5,855,443 issued on Jan. 5, 1999 to Ronald K. Faller et al., titled "Breakaway Connection System For Roadside Use," describes an assembly comprising a pair of parallel plates welded to the adjacent ends of a base and an extension pole. A series of bolts are installed through holes in the plates, with one or more collars or shearing plates installed on each bolt between each of the parallel plates. When the upper pole is struck, the relatively larger diameters of the collars impart shearing forces upon the relatively smaller diameters of the connecting bolts, thereby breaking the bolts and allowing the upper portion of the sign to break away from the fixed base. As the bolts pass through holes in the plates, they cannot escape from the plates and must break in order to allow the upper portion of the structure to break away. Also, it is noted that the posts are welded to the plates, and cannot be replaced after impact damage. In contrast, the bolts securing the two subassemblies of the present sign structure together and the pipe(s) or post(s) of the structure, may be reused or replaced as separate components, as required.

U.S. Pat. No. 6,254,063 issued on Jul. 3, 2001 to John R. Rohde et al., titled "Energy Absorbing Breakaway Steel Guardrail Post," describes a series of embodiments for guard rail posts, each including some means of predictable failure in a given direction. Each of the embodiments includes some component(s) (cables, shear plates, and/or bolts) which are damaged as a result of impact force on the guard rail supported by the post, with such damaged components requiring replacement, unlike the present invention.

U.S. Pat. No. 6,264,162 issued on Jul. 24, 2001 to Theodore D. Barnes et al., titled "Breakaway Sign Post," describes an assembly having a frangible collar joining the base and upper sections of the post. The collar includes vertically disposed slots therein, which allow the portion of the collar wall defined by the slots to fold when the upper portion of the post assembly is struck. The components of the Barnes et al. post assembly do not separate from one another, and the Barnes et al. collar must be replaced after the upper post is bent over. The Barnes et al. post assembly thus more closely resembles the post assembly of the Katt '906 U.S. patent, discussed further above, than it does the present invention.

Canadian Patent Publication No. 973,677 issued on Sep. 2, 1975 to John Shewchuck, titled "Coupling For Break Away Pole Bases," describes a system wherein a pole is supported above a base by a series of frangible spacers. An impact force on the pole causes the spacers to break, thereby allowing the pole to separate from the base and fall rather than resisting the impact. The same problem occurs here as has been noted further above in the discussion of other assemblies having frangible components, i.e., the specially formed frangible components must be replaced before the pole or post assembly can be reassembled. These frangible components are generally specially made and are therefore relatively costly, in comparison to "off the shelf" stock items such as conventional bolts, etc. The present invention enables most, if not all, components to be reused after an impact.

German Patent Publication No. 1,255,128 published on Nov. 30, 1967 illustrates a post having a base bracket with a pair of laterally spaced bolts passing therethrough and through the bottom of the post seated in the bracket. The bracket also includes opposed, inwardly turned flanges which penetrate the wood post along opposite sides thereof. If a post having this construction were to be impacted, either the bottom of the post, the bracket, or the bolts, or some combination of these components, would be damaged and would require replacement, unlike the present post or pole assembly.

Finally, the inventors are aware of an assembly manufactured by the P. & H. Tube Corporation of Houston, Tex., titled the "Poz-Loc Slip-Base System." The Poz-Loc System comprises a series of embodiments, each having a pair of triangular slip base plates which are secured to the adjacent ends of an anchor post and a second post extending upwardly therefrom. Each of the triangular plates includes a notch at each apex, with a bolt being installed through each notch to hold the plates together. This system is similar to that described in the Nehls '592 U.S. patent, with the present invention also utilizing paired triangular slip base plates having notched apices for the connecting bolts. The triangular slip base plate of the Poz-Loc base post is permanently attached thereto (welded, etc.), while the slip base plate of the upper post section includes a cylindrical sleeve, into which the lower end of the upper post is installed. The sleeve of the upper slip base plate is installed over the lower end of the upper post, and a split ring collar is installed between the slip base plate and the lower end of the post to retain the upper slip base plate on the upper post. The collar is secured by means of a pinch bolt. The Poz-Loc System meets the standards of the Texas Universal Triangular Slipbase System (TUTSS), but a problem arises when posts having a cylindrical shape (i.e., pipe, round tubing, etc.) is used in an assembly comprising a single post, as in the case of a relatively small sign (stop sign, etc.). In conditions of high wind, and/or gusts created by passing vehicles (particularly large trucks), the wind may impart sufficient force on the flat plate of the sign to produce significant torsional loads on the post to which the sign is attached. The sign generally cannot turn on the post, as such signs are generally attached by means of through bolts or other fastening means which preclude rotation of the sign relative to the post. However, the torsional force produced by the sign is transferred to the post, where it attempts to turn the base of the post in the slip base. The upper slip base cannot turn, as it is bolted to the fixed lower slip base by means of the three apex bolts. However, the upper pipe can turn or rotate within the sleeve of the upper triangular slip base plate, even though it is held in place by the split ring collar. It is extremely difficult to torque the pinch bolt of the collar sufficiently to completely immobilize the base of the upper post within the collar, and/or to clamp the two slip bases sufficiently to immobilize the collar therebetween. In high wind conditions, a sign supported by the Poz-Loc system can rotate out of its desired alignment where it is visible to drivers, within a week or so of adjustment. The Poz-Loc system requires regular and frequent maintenance in order to maintain the alignment of signs supported thereby, with the maintenance requiring the entire slip base assembly to be disassembled in order to access the pinch bolt of the split collar for retorquing of that bolt. In contrast, the present system utilizes a series of set screws which pass through the walls of the cylindrical sleeve of the slip base, and engage the pipe installed therein. No separate collar is used with the present sign support system. It is impossible for the sign support pipe to rotate within the slip base plate using the set screws of the present invention which penetrate the walls of the slip base sleeve and engage the pipe therein, to immovably affix it in place.

None of the above inventions and patents, taken either singularly or in combination, is seen to describe the instant invention as claimed. Thus a breakaway post base solving the aforementioned problems is desired.

SUMMARY OF THE INVENTION

The present invention comprises a breakaway post base for use with highway and road signs and the like, where the support structure includes an intentionally weakened area allowing it to separate at that point in order to avoid further damage to the structure upon impact by a vehicle or the like. The present system meets the standards of the Texas Universal Triangular Slipbase System (TUTSS), and incorporates a pair of slip base components.

The two slip base components each comprise a triangular shape with a notch at each of the three apices of each triangle. One slip base is secured to each of the post components of the assembly, and are disposed adjacent one another when the components are assembled. A bolt is installed in each apex notch, to hold the two slip base components together. An impact on the upper pipe or support dislodges the bolts from the apex notches, allowing the upper portion of the assembly to depart from the base which is permanently and immovably affixed in the ground, without damage to either the base or upper components of the assembly.

The present invention differs from the prior art in that at least one of the slip bases includes a sleeve into which the end of the cylindrical pipe is installed, with the pipe being immovably affixed within the sleeve by means of a series of set screws which pass through the wall of the sleeve and engage the pipe therein to lock the pipe immovably relative to the sleeve. Thus, a sign supported on an upper pipe or tube which is in turn secured in a slip base constructed in accordance with the present invention, cannot rotate or become misaligned.

Accordingly, it is a principal object of the invention to provide a breakaway post base for highway and road signs and the like, which assembly includes a pair of adjacent, triangular slip base plates which are assembled together, with the assembly meeting the standards of the Texas Universal Triangular Slipbase System.

It is another object of the invention to provide such a breakaway post base system or assembly which includes at least one slip base component having a cylindrical sleeve extending therefrom for accepting one end of a cylindrical pipe or tube therein, with the pipe or tube being secured within the sleeve by a series of set screws which pass through the sleeve and engage the pipe or tube end within the sleeve to affix the pipe or tube immovably therein and prevent rotation of the pipe within the sleeve.

It is a further object of the invention to provide such a breakaway post system or assembly including componentry for mounting the assembly to a concrete pad and/or joining pipes and tubes of equal or different diameters together, as desired.

Still another object of the invention is to provide such a breakaway system including spacer means and means for retaining the plate attachment bolts together as a group in the event the plates are separated by impact or other force.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises various embodiments of a breakaway post base, for supporting traffic signs and the like which may be subject to impact from a motor vehicle. The present post base embodiments all include means for preventing rotation of the post or sign support column within the base, thereby eliminating the periodic maintenance and corresponding labor costs involved in readjusting the orientation of the post or support column and the sign supported thereon.

Figure 1:
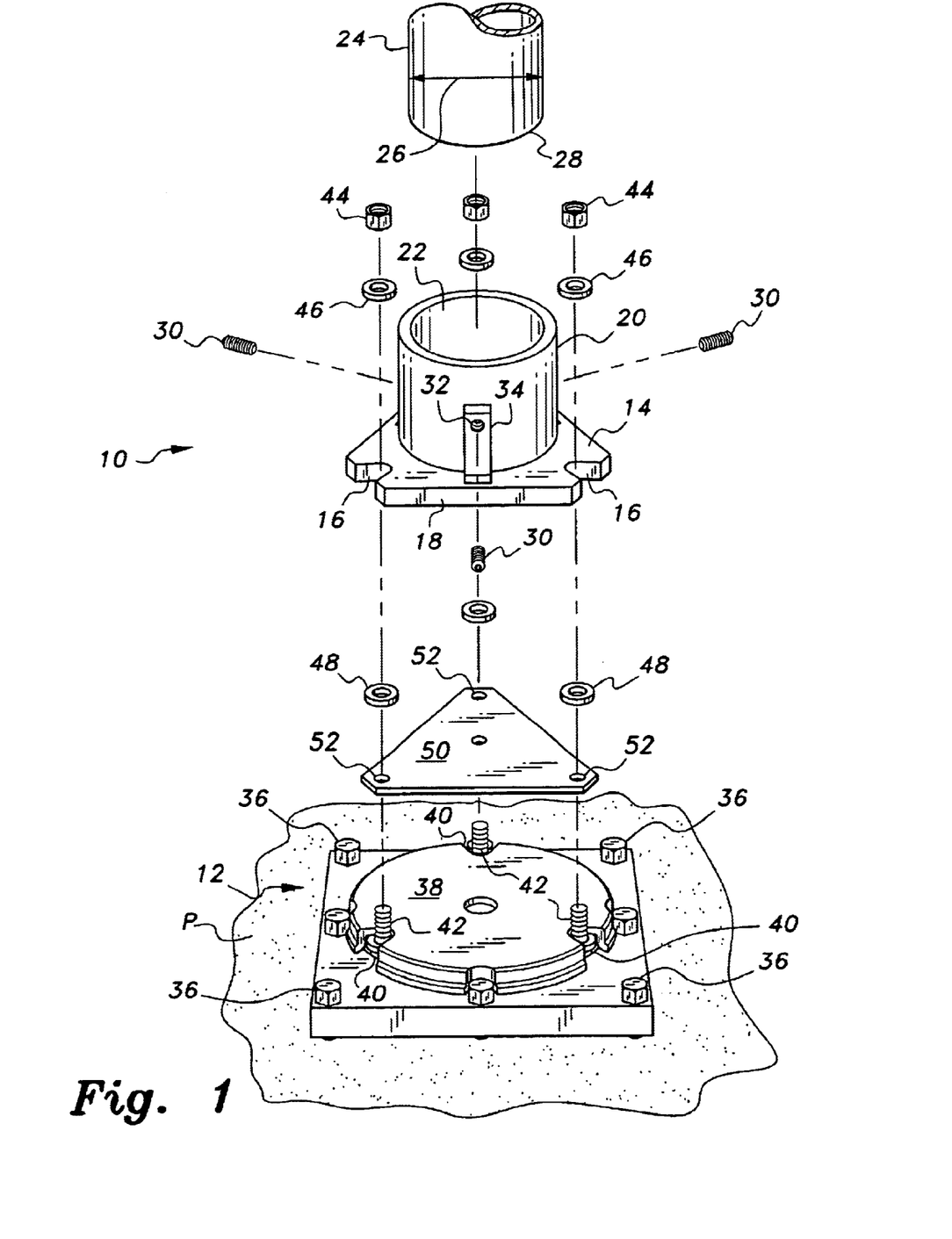
FIG. 1 is an exploded perspective view of a first embodiment of the breakaway post base of the present invention, illustrating a base plate for mounting the assembly to a concrete pad.

FIG. 1 of the drawings illustrates a first embodiment of the present invention, wherein a breakaway device 10 is secured to a mounting base 12 which is in turn secured to a concrete base pad P. The breakaway device 10 comprises a slip base plate 14 having a plurality of bolt clearance notches 16 formed in the periphery 18 thereof. The slip base plate 14 may be formed to have any practicable shape or planform as desired, but a triangular planform with three apices each containing a bolt clearance notch 16 therein, has been found to work well. A support column sleeve 20 having a cylindrical configuration extends from the slip base plate 14, with the cylindrical axis of the sleeve 20 oriented substantially normal to the plane of the slip base plate 14. The slip base plate 14 and support column sleeve 20 are preferably formed as a single, monolithic component, e.g. cast, forged, etc., although the sleeve 20 may be welded or otherwise securely affixed to the plate 14, if so desired.

The area of the slip base plate 14 subtended by the support column sleeve 20, along with the sleeve 20, define a socket 22 for a support column 24. A support column 24 for a sign or other structure is provided, with the column 24 having a diameter 26 which closely fits within the interior of the support column socket 22. The support column 24 may be formed of any suitable elongate material providing sufficient structural strength to support the structure attached thereto. Preferably, a length of galvanized steel pipe having sufficient wall thickness (e.g., schedule 10, 20, 40, 80, 120, 160, etc.) is used, as required.

The first or lower end 28 of the support column 24 is inserted into the socket 22 and is secured therein by a series of set screws 30, which thread into cooperating passages 32 formed in the side wall of the support column sleeve 20. Additional reinforcing bosses 34 surround each of the set screw passages 32, and extend along the side of the sleeve 20 to join with the slip base plate 14. The set screws 30 provide sufficient force when torqued to the desired value, to slightly penetrate the support column 24 wall, particularly when chisel point set screws are used. This serves to lock the support column 24 immovably within the socket 22, precluding rotation of the support column 24 relative to the socket 22 and its integral slip base plate 14, thereby assuring that any structure (sign, etc.) attached to the support column 24 cannot rotate to some other orientation than that originally installed.

The mounting base 12 provides for the secure and immovable attachment of the breakaway device 10 to a fixed structure, e.g., the concrete mounting pad P of FIG. 1. The mounting base 12 is immovably affixed to the underlying concrete pad P (or other suitable structure) by a series of bolts 36, which in turn engage conventional anchors (not shown) imbedded in the concrete. Other attachment means may be provided as desired. The mounting base 12 includes an integral raised mounting pad 38 extending upwardly therefrom, atop which the slip base plate 14 is installed. The, periphery of the mounting pad 38 includes a plurality of bolt slots or passages 40 therein, corresponding in number to the number of bolt clearance notches 16 provided in the slip base plate 14.

A series of base plate attachment bolts 42 are installed from beneath the slip plate mounting pad 38 of the base 12, with their threaded shanks extending upwardly to engage the corresponding bolt clearance notches 16 of the overlying slip plate 14. Corresponding nuts 44 are used atop the corners of the slip base plate 14 to clamp the plate 14 to the underlying mounting base structure 12. Washers 46 may be installed between the heads of the bolts 42 and the overlying mounting pad 38 structure, and between the upper surface of the slip base plate 14 and overlying nuts 44, with additional spacer washers 48 being installed as desired between the mounting pad 38 and the overlying slip base plate 14. A bolt retainer plate 50 having a series of bolt passages 52 therein is disposed between the mounting pad 38 and the slip base plate 14, with the bolts 42 installed through the retainer plate bolt holes 52 when the components are assembled. The retainer plate 50 serves to hold the bolts 42, their corresponding nuts 44, washers 46, and spacers 48 together as a group in the event the breakaway device 10 and its support column 24 are dislodged from the mounting base 12.

The notched slip base plate 14, along with the notched mounting pad 38 of the mounting base 12, allow the bolts 42 to slip from those notches in the event the support column 24 is struck by a vehicle or other impact, thereby releasing the breakaway device 10 from its mounting base 12. This reduces impact forces by allowing free movement of the support column 24 and structure attached thereto, and greatly reduces or eliminates damage to any of the components to allow their reuse.

Figure 2:
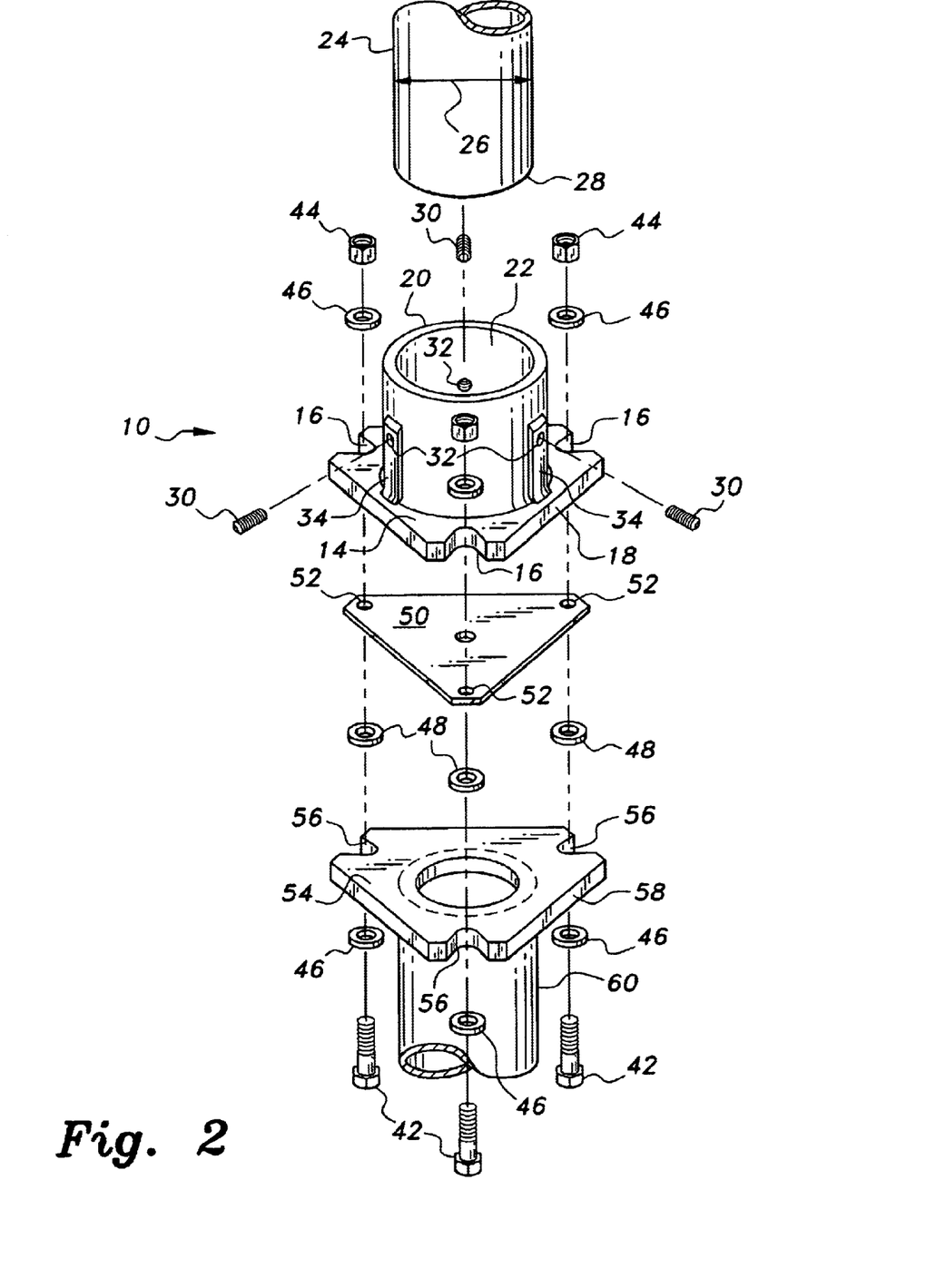
FIG. 2 is an exploded perspective view of a second embodiment of the present breakaway post base, illustrating a base comprising a base pipe and slip base plate welded thereto.

FIG. 2 illustrates a second embodiment of the present breakaway post base invention, wherein the breakaway device 10 attaches to a similar fitting which is in turn permanently and immovably affixed (e.g., welded, etc.) to a lower support column. The upper breakaway device 10 of FIG. 2 will be seen to be identical to the breakaway device 10 illustrated in FIG. 1 (although it is turned sixty degrees relative to the breakaway device 10 of FIG. 1), comprising a slip base plate 14 having a series of corners or apices, each with a bolt clearance notch 16 formed therein. As in the case of the breakaway device 10 of FIG. 1, the device 10 of FIG. 2 has a triangular periphery 18 with three apices and bolt clearance notches 16, but other plate shapes and different numbers of bolt clearance notches may be used as desired.

A support column sleeve 20 extends from the plate 14, with the sleeve 20 defining a support column socket 22 for securing a first end 28 of a support column 24 therein. The column 24 has a diameter 26 fitting closely within the socket 22, and may be formed of any suitable pipe schedule material, depending upon the wall thickness required, as described further above in the discussion of the support column 24 of FIG. 1. The column 24 is retained in the socket 22 by a series of set screws 30 which thread into corresponding threaded passages 32 in the side wall of the support column sleeve 20, to grip the first end 28 of the support column 24 immovably therein. Corresponding reinforcement bosses 34 extend along the sides of the sleeve 20, surrounding the threaded set screw passages 32 and extending to merge with the base plate 14.

The breakaway device 10 of FIG. 2 secures to a lower slip base anchor plate 54 which includes a series of bolt clearance notches 56 formed in the periphery 58 thereof, with the notches 56 corresponding in number and spacing to the bolt clearance notches 16 of the slip base plate 14 of the breakaway device 10. Preferably, the lower slip base plate 54 is congruent with the slip base plate 14 of the breakaway device 10. However, this is not critical, so long as the bolt clearance notches 16 and 56 respectively of the slip base plate 14 and lower plate 54 correspond and are in alignment with one another upon assembly. The lower anchor slip base plate 54 is permanently affixed (welded, etc.) to an anchor support column 60, comprising a pipe of suitable wall thickness or schedule, as in the first support column 24, or other suitable structural material which may in turn be anchored in a concrete pad or footing, etc. to secure the assembly.

The breakaway device 10 is secured to the lower anchor slip base plate 54 by a series of base plate attachment bolts 42, nuts 44, and washers 46, with the fastener components 42 through 46 being conventional and essentially the same as those identically numbered components illustrated in FIG. 1 of the drawings. A series of spacer washers 48 and a bolt retainer plate 50 may be installed between the two slip base plates 14 and 54. The bolt retainer plate 50 includes a series of bolt passages 52 therethrough, through which the bolts 42 pass. The retainer 50 functions in the manner described for the plate 50 of FIG. 1, capturing the bolts 42, nuts 44, and washers 46, 48 as an assembly.

Figure 3:
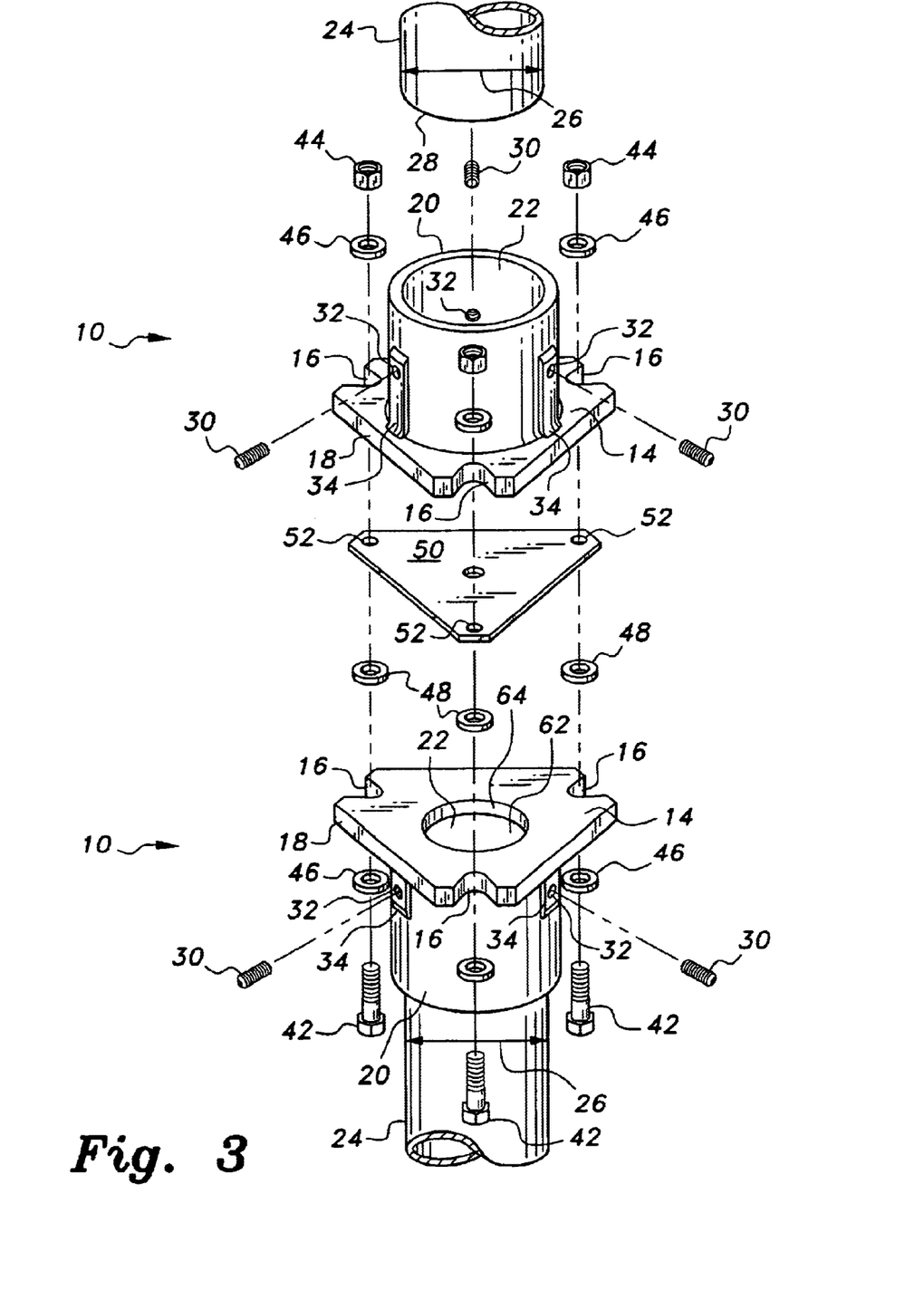
FIG. 3 is an exploded perspective view of a third embodiment of the present breakaway post base, illustrating two triangular slip base plates and integral sleeves for joining two pipes.

FIG. 3 illustrates a further embodiment of the present invention, wherein two breakaway devices 10 are assembled in mirror image. The two breakaway devices 10 of FIG. 3 will be seen to be identical to the breakaway devices 10 illustrated in FIGS. 1 and 2, each including a slip base plate 14 having a series of corners or apices, each with a bolt clearance notch 16 formed therein. As in the case of the breakaway devices 10 of FIGS. 1 and 2, the devices 10 of FIG. 3 have triangular peripheries 18 each with three apices and bolt clearance notches 16, but other plate shapes and different numbers of bolt clearance notches may be used as desired.

A support column sleeve 20 extends from each plate 14, with each sleeve 20 defining a support column socket 22 for securing a first end 28 of a support column 24 therein. The column 24 has a diameter 26 fitting closely within the socket 22, and may be formed of any suitable pipe schedule material, depending upon the wall thickness required, as described further above in the discussion of the support column 24 of FIG. 1. The column 24 is retained in the corresponding socket 22 by a series of set screws 30 which thread into corresponding threaded passages 32 in the side wall of each support column sleeve 20, to grip the first end 28 of the support column 24 immovably therein. Corresponding reinforcement bosses 34 extend along the sides of each sleeve 20, surrounding the threaded set screw passages 32 and extending to merge with the corresponding base plate 14. The support column sleeve 20 and support column 24 of the lower breakaway device 10 may have different diameters than the corresponding components of the upper breakaway device 10.

The breakaway devices 10 of FIG. 3 are secured to one another by a series of base plate attachment bolts 42, nuts 44, and washers 46, with the fastener components 42 through 46 being conventional and essentially the same as those identically numbered components illustrated in FIGS. 1 and 2 of the drawings. A series of spacer washers 48 and a bolt retainer plate 50 may be installed between the two slip base plates 14 and 54. The bolt retainer plate 50 includes a series of bolt passages 52 therethrough, through which the bolts 42 pass. The retainer 50 of FIG. 3 functions in the manner described for the plate 50 of FIG. 1, capturing the bolts 42, nuts 44, and washers 46, 48 as an assembly and precluding their separation from one another in the event the two breakaway devices 10 become dislodged from one another.

It will be noted upon review of the lower breakaway device 10 illustrated in FIG. 3 in an inverted position relative to the upper breakaway device of that FIG., that a passage 62 is formed through the slip base plate 14, generally concentric with the support post socket 22. It will be seen that the rim of the passage 62 is relatively smaller than the diameter 26 of the support post 24. This smaller diameter rim defines a support column stop 64 within the base of the corresponding support column socket 22. This serves to preclude passage of any portion of the support column 24 through the slip base plate 14, unlike the P. & H. Tube Corporation slip base system, which requires the slip base assembly to be passed completely over a portion of the support column in order to install a split collar clamp on the support column.

Figure 4:
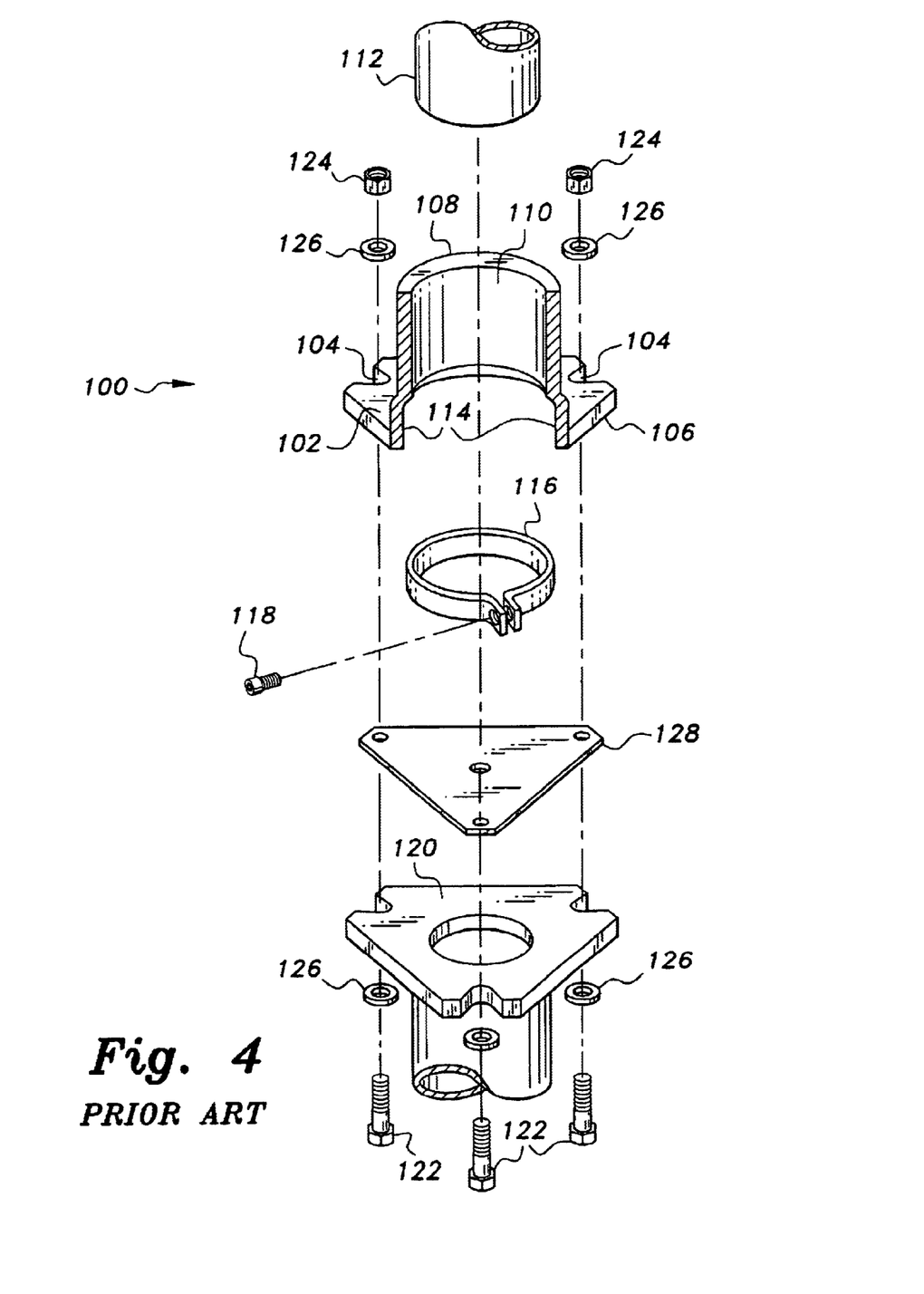
FIG. 4 is an exploded perspective view of a prior art breakaway post base assembly, illustrating the split ring collar and pinch bolt used to secure the pipe within the slip base.

FIG. 4 of the drawings provides an exploded perspective view in partial section of an exemplary P. & H. Tube Corporation slip base assembly of the prior art. The P. & H. Tube Corporation assembly comprises a first breakaway device 100, including a slip base plate 102 with a plurality of bolt clearance notches 104 formed in the periphery 106 thereof. A support column sleeve 108 extends from the slip base plate 102 to define a support column socket 110 for a support column 112. However, it will be noted that the interior of the lower end 114 of the sleeve 108, where it joins the slip base plate 102, is considerably wider than the remainder of the sleeve interior 108. This is due to the need for the P. & H. assembly to provide room for a split shaft collar 116, which is secured about the first end of the support column 112 by a pinch bolt 118.

The P. & H. post support is assembled by first sliding the breakaway device 100 along the support column 112, with the end of the support column 112 passing completely through the breakaway device 100. This exposes the end of the column 112 beyond the slip base plate portion 102 thereof to allow the split shaft collar 116 to be secured about the end of the support column 112, thereby capturing the end of the support column 112 within the sleeve 108 of the breakaway device 100. The assembly comprising the breakaway device 100, the support column 112, and the split shaft collar 116, is then bolted to a mating slip base plate 120, using conventional bolts 122, nuts 124, and washers 126. A bolt retainer plate 128 may be installed between the two slip base plates 102 and 120.

The problem with the above described P. & H. breakaway assembly of FIG. 4, is that in areas of relatively high winds, a sign supported by such an assembly can produce a torque on the cylindrical support column 112. Such signs are generally bolted to the support column by bolts passing through the column, so the sign and column are rotationally affixed to one another. However, the rotational force imparted to the sign, is transferred along the length of the support column 112, whereupon the bottom end of the column 112 attempts to turn or rotate within the rotationally fixed breakaway device 100.

The primary force developed for resisting such rotation of the base of the column 112 within the breakaway device 100, is due to the clamping action of the two slip base plates 102 and 120, clamping and sandwiching the split shaft collar 116 therebetween, with the collar 116 being clamped to the end of the support column 112. It will be seen that the circular shapes of these components results in considerable clamping force being required to lock the components together, as the relatively long moment arm provided by the span of a sign secured to the support column 112, results in an extremely high torque being developed within the breakaway device 100. Even torquing the pinch bolt to sixty foot-pounds and torquing the attachment bolts to forty foot-pounds, is often insufficient to lock the components immovably relative to one another for an extended period of time, with maintenance crews having to travel to the location of the sign, to disassemble, retorque, and reassemble the components on a frequent basis.

In contrast, the set screws used to lock the support column within the breakaway device of the present invention, provide some penetration of the wall of the support column to lock the column immovably in place relative to the breakaway device. The support column is essentially pinned in place within the breakaway device by the series of set screws, and cannot move relative to the screws or the breakaway device. The result is a sign installation which remains fixed and immobile, regardless of torsional forces imposed upon the sign due to winds, gusts due to the passage of trucks and other vehicles, etc. The present breakaway post base will thus pay for itself in short order, by greatly reducing or eliminating the periodic maintenance required of earlier devices of the prior art.

It is to be understood that the present invention is not limited to the embodiments described above, but encompasses any and all embodiments within the scope of the following claims.

We claim:

1. A breakaway post base comprising:

a slip base plate having a periphery including a plurality of bolt clearance notches formed therein;

a cylindrical support column sleeve extending normal to said slip base plate and integrally formed therewith;

said sleeve and said slip base plate defining a support column socket;

a cylindrical support column having a diameter and a first end installed within said support column socket;

said sleeve further including a plurality of threaded set screw passages formed therethrough;

a plurality of reinforcement bosses disposed upon said support column sleeve, each one of said reinforcement bosses surrounding each of said plurality of threaded set screw passages, and extending to and joining with said slip base plate;

a set screw threadedly installed within each of said threaded set screw passages that grips said first end of said support column immovably within said sleeve by engaging and slightly penetrating a wall of said cylindrical support column after a predetermined force is applied to each set screw when torqued to prevent rotation of said support column within said sleeve and to facilitate simple angular rotational adjustment of the support column;

a mounting base;

a raised mounting pad extending from said mounting base and formed integrally therewith, for bolting said slip base plate thereto;

said mounting base and said mounting pad further including a plurality of bolt passages therethrough;

said plurality of bolt passages of said mounting base and said mounting pad corresponding in number to said plurality of bolt clearance notches of said slip base plate; and a plurality of bolt and nut assemblies installed through said bolt passages of said mounting base and said mounting pad and in said bolt clearance notches of said slip base plate, to secure said slip base plate to said mounting pad of said mounting base.

2. The breakaway post base according to claim 1, wherein:

said slip base plate further includes a passage formed therethrough, within said support column socket; and said passage has a rim smaller than said diameter of said support column, with said rim defining a support column stop within said support column socket for precluding passage of said support column past said slip base plate.

3. The breakaway post base according to claim 1, wherein:

said slip base plate comprises a triangular planform with three apices; and one of said bolt clearance notches is disposed at each of said apices.

4. The breakaway post base according to claim 1, further including:

a bolt retainer plate disposed between said slip base plate and said mounting pad of said mounting base;

said bolt retainer plate further including a plurality of bolt passages therethrough; and said bolts of said bolt and nut assemblies being installed through said bolt passages of said bolt retainer plate, with said bolt retainer plate holding and securing said bolt and nut assemblies therein when said slip base plate is dislodged from said mounting base.

5. The breakaway post base according to claim 1, wherein said support column is selected from the group of support columns consisting of schedules 10, 20, 40, 80, 120, and 160 galvanized steel pipe.

* * * * *